(12) United States Patent
Blom

(10) Patent No.: US 7,490,488 B2
(45) Date of Patent: Feb. 17, 2009

(54) CIRCULAR KNITTING MACHINE AND ELECTRIC MOTOR

(75) Inventor: Stig-Arne Blom, Ulricehamn (SE)

(73) Assignee: Memminger-IRO GmbH, Dornstetten (DE)

(*) Notice: Subject to any disclaimer, the term of this patent is extended or adjusted under 35 U.S.C. 154(b) by 0 days.

(21) Appl. No.: 11/791,736

(22) PCT Filed: Dec. 6, 2005

(86) PCT No.: PCT/EP2005/013067
§ 371 (c)(1),
(2), (4) Date: Dec. 26, 2007

(87) PCT Pub. No.: WO2006/061190
PCT Pub. Date: Jun. 15, 2006

(65) Prior Publication Data
US 2008/0173047 A1    Jul. 24, 2008

(30) Foreign Application Priority Data
Dec. 7, 2004    (DE)    ........................ 10 2004 058 920

(51) Int. Cl.
*D04B 15/48*    (2006.01)
(52) U.S. Cl. .................................. 66/132 R
(58) Field of Classification Search .................. 66/54, 66/55, 56, 132 R, 132 T, 131
See application file for complete search history.

(56) References Cited

U.S. PATENT DOCUMENTS

| 4,194,376 A | 3/1980 | Valks et al. |
| 4,574,353 A | 3/1986 | Hellström et al. |
| 4,587,812 A | 5/1986 | Brega |
| 5,174,133 A * | 12/1992 | Kawase et al. .................. 66/57 |
| 5,327,064 A | 7/1994 | Arakawa et al. |
| 5,511,392 A * | 4/1996 | Sawazaki et al. ................ 66/54 |
| 5,532,533 A | 7/1996 | Mizutani |
| 5,816,079 A * | 10/1998 | Wang .......................... 66/218 |
| 5,912,541 A | 6/1999 | Bigler et al. |
| 6,151,924 A * | 11/2000 | Plath et al. .................. 66/132 T |
| 6,301,938 B1 | 10/2001 | Takeuchi et al. |
| 6,310,455 B1 | 10/2001 | Siraky et al. |
| 2004/0237600 A1 | 12/2004 | Omeda |

FOREIGN PATENT DOCUMENTS

| DE | 28 20 747 A1 | 11/1978 |
| DE | 299 06 804 U1 | 8/1999 |
| DE | 100 32 705 A1 | 1/2002 |

(Continued)

OTHER PUBLICATIONS

International Search Report dated Feb. 21, 2006.

(Continued)

*Primary Examiner*—Danny Worrell
(74) *Attorney, Agent, or Firm*—Flynn, Thiel, Boutell & Tanis, P.C.

(57) ABSTRACT

A motor speed controller is structurally integrated into an electric motor for a belt drive in a circular knitting machine. The motor speed controller is connected by means of a cable strand with an interface unit placed at the circular knitting machine. The motor speed controller directly controls the electric motor windings and receives in the cable strand only the motor supply current and a motor speed target value.

18 Claims, 3 Drawing Sheets

FOREIGN PATENT DOCUMENTS

| | | |
|---|---|---|
| EP | 0 078 550 A1 | 5/1983 |
| EP | 1 087 048 A2 | 3/2001 |
| EP | 1 491 673 A1 | 12/2004 |
| JP | 60-102839 A | 7/1985 |
| WO | WO 02/02856 A2 | 1/2002 |
| WO | WO 03/031708 A1 | 4/2003 |

OTHER PUBLICATIONS

Information—Motor Belt Drive, Memminger-IRO GmbH, (Bulletin) Dec. 16, 2003.

* cited by examiner

CIRCULAR KNITTING MACHINE AND ELECTRIC MOTOR

FIELD OF THE INVENTION

The invention relates to circular knitting machine, and to an electric motor for driving a yarn feeding device at a circular knitting machine.

It is known from the technical information brochure "Motorbelt Drive" No. 027.900.000.01, dated Dec. 15, 2003, of the company Memminger-Iro GmbH, D-72277 Domstetten, to provide inverters the number of which corresponds to the number of electric motors in the belt drives, in a housing standing on the bottom beside the base of the circular knitting machine, the housing containing the machine control. Each inverter is connected by means of a cable strand with one electric motor and inverts the main current into a direct current with the frequency varying under consideration of a target value being derived from the machine encoder signals. This speed signal or driving current signal corresponds to the respective target value. The machine encoder and a control terminal for setting of operation parameters, e.g. of the yarn feeding amount for each belt drive, are connected to the inverters. Due to the relative high position of the electric motors the cable strands have to be long. However, the speed signals and the driving current signals are very prone to disturbances and even might be reasons for disturbances themselves even if considerable shielding measures are provided. Motor encoders which are associated to at least some of the electric motors are in communication via signal cables with the inverters in the housing for the respective comparison between the target value and the actual value. Disturbances of transmissions and/or disturbances caused by the transmissions along the long cable strands endanger the operational safety of the circular knitting machine and may negatively influence the quality of the knitwear.

The respective driving belt for a group of yarn feeding devices of the circular knitting machine known from EP 0078 550 B1 is driven by a driving pulley having a variable diameter, a so-called QAP-wheel, which either rotates with the driving speed of the circular knitting machine or with a speed which is strictly proportional to the speed of the circular knitting machine. In order to achieve a belt velocity different from the given speed of the driving pulley, the active diameter of the driving pulley is changed, however, only after first stopping the circular knitting machine. Each yarn feeding device has an electronic control device for the setting of different modes of operation and of functions depending on the knitting pattern or on colors. Each yarn feeding device may operate with up to four different or equal yarns. The yarn feeding devices are integrated into a bus system and are connected with a central control facility which may be mounted at the same carrying ring as the yarn feeding devices themselves.

The central provision of the motor speed signals or motor driving current signals in the speed control system and the transmission of those signals via long cable strands to variable speed electric servomotors placed in the belt drives has recently become a standard substitution for the above mentioned quality wheels (QAP). Examples of such concepts can be found in DE 28 20 747 A, US 2004/0237600 A1, U.S. Pat. No. 6,301,938 B1, WO 02/02856 A.

It is an object of the invention to improve the operational safety of a circular knitting machine having an electric motor in the belt drives, in order to ensure a high quality of the knitwear.

This object can be achieved by providing a motor speed controller having power electronics and control electronics structurally incorporated into the electric motor, the motor speed controller being internally directly connected to the electric motor windings and being connected externally via a cable strand to an interface unit arranged separately from the electric motor at the circular knitting machine, to which interface unit the machine encoder is connected, and that the motor supplying current and a target value of the target speed of the electric motor are provided by the interface unit via the cable strand, the target value at least being derived from the signals of the machine encoder. The invention is also embodied by a motor speed controller having power electronics and control electronics structurally integrated into the electric motor and the motor speed controller is connected with a cable strand for the transmission of the motor supply current and of a target value of the electric motor target speed.

Due to the structural measure, to directly incorporate the motor speed controller inclusive control electronics and powering electronics, e.g. with a PWM-modulator, into the electric motor and to transmit only the motor supplying current and at least the target value which is related to the actual knitting machine speed in the cable strand, the necessity to transmit speed signals or driving current signals, which are prone to disturbances and are active to cause disturbances themselves, on long cable paths at the circular knitting machine is avoided. Only the motor supplying current, e.g. a direct current, is supplied to the electric motor. This transmission is insensitive to disturbances and also hardly is a reason for disturbances at other electronic or electric components. The same is true for the target value which can be transmitted without disturbances. The target value mainly serves as a speed information and, in some cases also includes a position information. The needed speed signals or driving current signals are first generated de-centrally in the electric motor by the motor speed controller and are transmitted internally to the motor windings over shortest distances where they are not prone to disturbances. As well the balancing between the target value and the actual value is carried out at this location. The interface unit can be designed compactly and, for this reason, consumes only relatively few space at the circular knitting machine. The interface unit may even be placed optimally close to the electric motors. With the help of the signals of the machine encoder and, in some cases with the parameters set at the setting terminal, the respective target values are derived in the interface unit and are transmitted to the motor speed controllers. The target values, e.g. may be current levels or voltage levels and may even be configured as digital messages when a field bus system is associated to the circular knitting machine. The transmitted target valued expediently represents, for the respective belt drive, a selected ratio between the actual speed of the knitting machine as recorded by the machine encoder and the target speed of the electric motor.

Expediently, a common interface unit is provided for all electric motors which are incorporated in several belt drives in the circular knitting machine. The common interface unit e.g. may contain a rectifying circuitry e.g. a switched power supply. The interface unit can even be arranged above the circular knitting machine, in some cases, separated from the circular knitting machine in order to not, or only minimally, obstruct access e.g. to the needle cylinder or to the base of the circular knitting machine.

Since the interface unit can be designed very compactly, it may be placed at the circular knitting machine above the ground preferably even in an upper portion of the knitting machine or, generally, strategically close to the electric motors in order to only need cable strands which are as short as possible.

In an expedient embodiment the interface unit comprises a main current inlet, several cable strands outlets, as well as preferably a group of inlets and/or outlets for a connection cable for a machine encoder, a connection cable for a setting terminal, and the like, at least one rectifier and a logic circuitry for deriving the target values. Each target value may not only contain speed information or directly encoder data but, in some cases, also information on the momentary position of the circular knitting machine. A connection cable for a setting terminal may be dispensed with, in the case that the interface unit is combined with the setting terminal or is even integrated into the setting terminal.

In an expedient embodiment a cable strand contains a direct current cable and a, preferably, even separate signal cable. The direct current generated out of the main current is transmitted in the direct current cable while the target value is transmitted in the signal cable.

In order to guarantee high transmission speeds and high safety against disturbances, e.g. in a field bus system associated to the circular knitting machine, at least the cables for transmitting information and/or target values and/or encoder data e.g. may be a CAN-bus or may even be optical fiber cables. So-called Toshiba links, abbreviated TOS-links, may be used in practice for this purpose.

In an expedient embodiment, in order to minimize the cabling, a motor encoder which is associated to the electric motor is preferably directly incorporated and is directly connected to the motor speed controller such that the balancing between the target value and the actual value can be carried out in each electric motor in a decentralized fashion.

An electromotor having an incorporated motor speed controller including powering electronics and control electronics is a perfectly customized driving unit for a belt drive of a circular knitting machine and allows problems to be avoided which until now had to be tolerated for the transmission of speed signals or driving signals which are prone to disturbances and which may cause disturbances themselves.

BRIEF DESCRIPTION OF THE DRAWINGS

An embodiment of the subject of the invention will be explained with the help of the drawings, in which.

DETAILED DESCRIPTION

Figure 1:
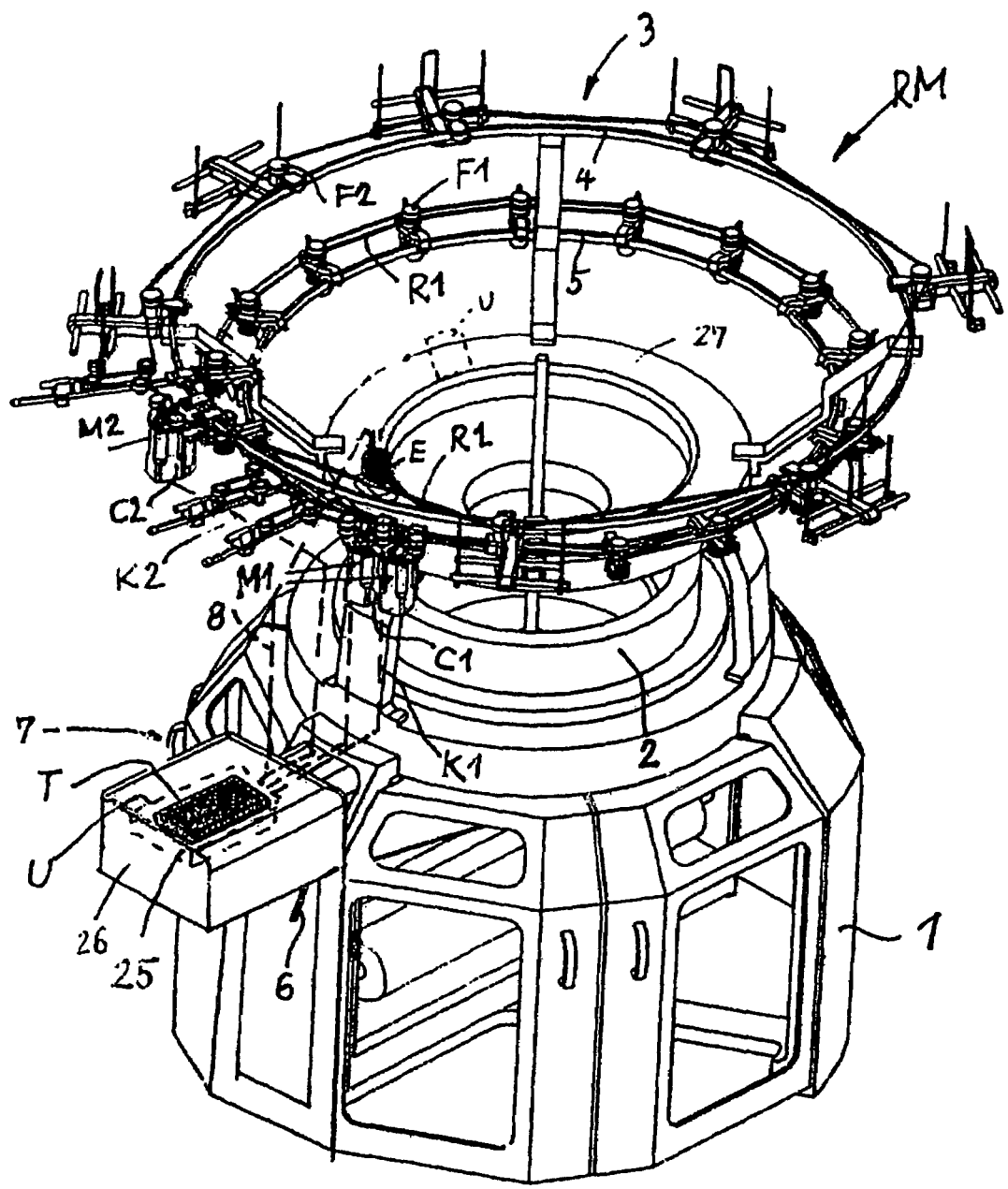
FIG. 1 is a schematic perspective view of a circular knitting machine.

FIG. 1 schematically illustrates a circular knitting machine RM which is shown by basic components only. The circular knitting machine RM rests with an e.g. polygonal base 1, on the ground and contains a needle cylinder 2 on top of which a feeder carrying system 3 is placed. Several yarn feeding devices F1, F2 of the same type or of different types are secured to carrying rings 4, 5 and are integrated in respective belt drives R1, R2. The belt drive driving the incorporated yarn feeding devices F1, F2 is driven by at least one electric motor M1, M2.

The electric motors M1, M2 e.g. are permanent magnet motors, i.e. synchronous alternating current or AC-motors. A speed controller C1, C2 having control electronics and powering electronics (FIG. 2) is integrated in each electric motor.

The electric motor M1, M2 is connected via a cable strand K1, K2 to an interface unit U. The interface unit U is common for all electric motors and e.g. is mounted at the base 1 of the circular knitting machine RM in an elevated position or is mounted separately from the circular knitting machine above the carrying system 3, or in some cases, is even integrated into the carrying system 3. In case of another, not shown, alternative, the interface unit U could be placed directly on the floor. Alternatively, the interface unit U (indicated in dotted lines) could be placed further higher up, e.g. at a ring carrier 27. The interface unit U is connected to a mains power cable 6.

A machine encoder E which is either integrated into or retro-fitted at the circular knitting machine RM scans the actual speed of the knitting machine and is connected via a signal cable 8 to the interface unit U. A setting terminal T is provided either close to the interface unit U which e.g. is received within a housing 26, or even is arranged combined with the interface unit U. The interface unit U forms in combination with the cable strands K1, K2 and the motor speed controllers C1, C2 a speed control system 7 to which functional parameters may be put in at the setting terminal T. The speed control system 7 only communicates with the circular knitting machine RM e.g. via the machine encoder E. A logical circuitry L is contained in the interface unit U for generating target values i1, i2 for the respective motor speed controller C1, C2, i.e. mainly speed information and, in some cases, even position information. The target values i1, i2 are generated with the help of the machine encoder signals and of input functional parameters (e.g. the yarn feeding amount and the like). These target values i1, i2 e.g. are current levels or voltage levels.

Figure 2:
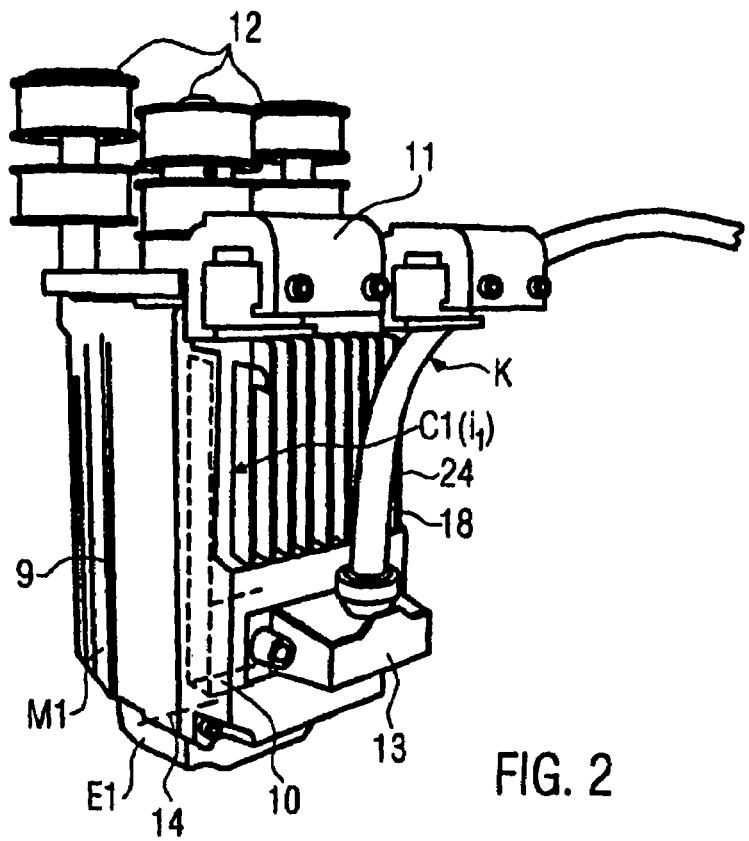
FIG. 2 is a perspective view of an electric motor.
Figure 3:
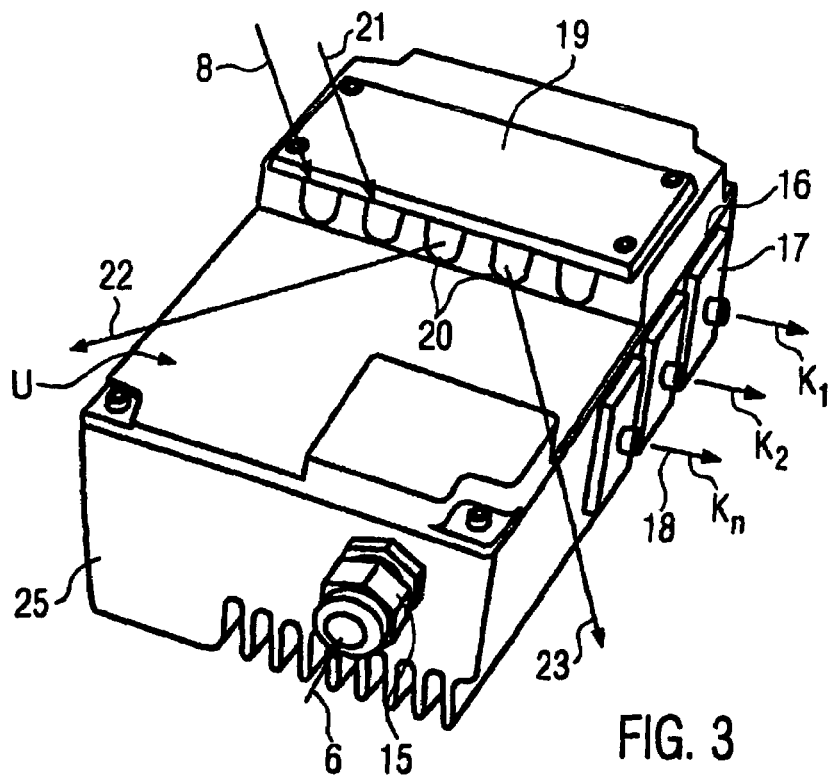
FIG. 3 is a perspective view of an interface unit.

The electric motor M1, shown in FIG. 2, has a housing 9 and a detachable housing cap 10 which has cooling fins. The motor speed controller C1 is arranged behind the housing cap 10 and is connected to the not shown motor windings. A clamping device 11 is provided at the motor housing 9 or at the housing cap 10 for securing the electric motor M1 e.g. at the carrying ring 7 of the carrying system 3. For driving the belt drive R2 e.g. driving rollers 12, could be provided which have either teeth or are designed like rod cages. The cable strand K1, K2 e.g. comprises a direct current cable 18 and a signal cable 24 the latter for transmitting the respective target value i. The signal cable 24 may extend from the current cable 18. A connector 13 receiving the cable strand K1, K2 is mounted at the housing cap 10.

In FIG. 2, a motor encoder E1 is directly integrated into the motor housing 9, e.g. at the lower end remote from the driving rollers 12. The motor encoder E1 directly communicates with the motor speed controller C1 via a signal connection 14. The motor encoder E1, which is connected to the motor speed controller C1, could instead be arranged separated from the electric motor M1 and could e.g. be directly driven by the respective belt drive R1, R2 via a driving roller running at the actual speed of the belt drive.

The interface unit U in the shown embodiment is a box 25 of substantially the shape of a parallel epipedon having an introducing bush 15 for the mains power cable 6 at one front side and, furthermore, outlets 16 protected by covers 17 for several (e.g. two times three) cable strands K1, K2, as in the illustrated case, to the electric motors M1, M2 in adjacent narrow sides. The cable strands K1, K2 exiting from the outlets 16 either consist of only the thick cables 18 while the signal cables 24 are separate or consist of the cable 18 and the signal cable 24.

Several inlets or outlets 20 are provided at an upper side of the housing 25 where e.g. the signal cable 8 from the machine encoder E and a connection cable 21 from the setting terminal T, a signal cable 23 e.g. to a lubrication device control, and the signal cable 22 may be connected, which signal cable 22 e.g. serially leads to all motor encoders E1 or the electric motors M1, M2 respectively. Later installed signal cables 23 used for superimposed monitoring tasks or control tasks e.g. for measuring the yarn consumption or the like may be connected there as well.

The signal cables 8, 21, 22, 23 and 24 expediently are fiber optic cables because optic signals are less prone to disturbances than electric signals and because of the high transmission speed. Particularly suitable as signal transmission cables are so-called Toshiba links, abbreviated TOS-links. The inlets and outlets 20 are covered by a plate 19 behind which e.g. printed circuit boards are arranged which may carry power components of the logic circuitry L.

Figure 4:
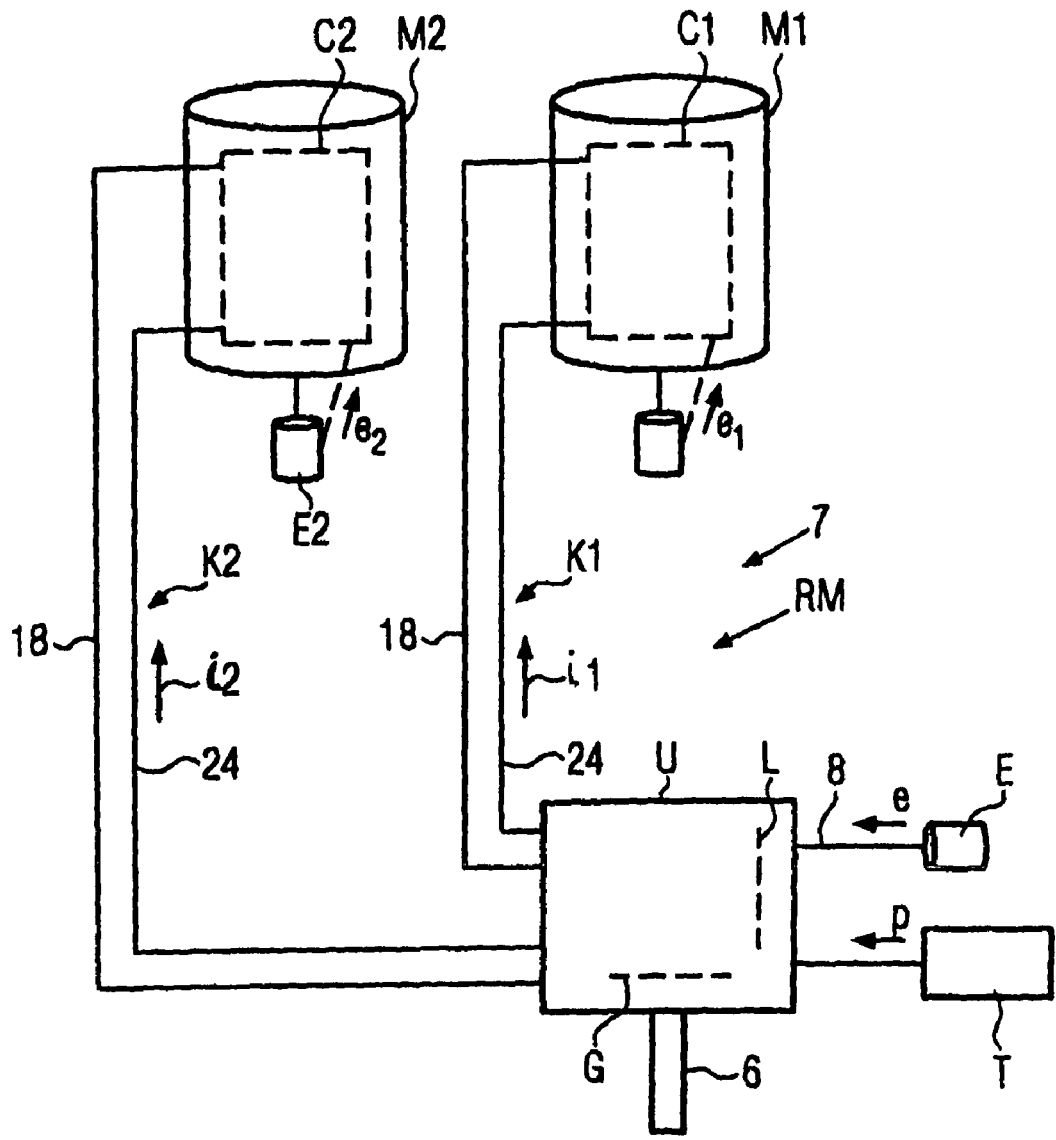
FIG. 4 is a simplified block diagram.

FIG. 4 shows a block diagram of the speed control system 7 of the circular knitting machine RM e.g. for two electric motors M1, M2. Each cable strand K1, K2 consisting of the thick cable 18 for the motor supplying current, e.g. direct current, and the signal cable 24 for a, in some cases, individual target value i1, i2, is connected to the common interface unit U. In the shown case (alternating current/direct current) the interface unit U contains a rectifying section G, e.g. a switching power supply, as well as the logic circuitry L for deriving the target value i1, i2. The logic circuitry L centrally processes, among others, information or machine encoder data e and the functional parameters p. The necessary target value/actual value comparison between the target value i1, i2 and the motor encoder data e1, e2, respectively, is carried out directly in the motor speed controllers C1, C2. In case that a deviation is detected, this deviation is converted into a respective control routine. For this reason, the motor speed control C1, C2 is equipped with the necessary power electronics and control electronics.

The invention claimed is:

1. Circular knitting machine comprising:
   yarn feeding devices which are incorporated into at least one belt drive of the circular knitting machine, wherein said belt drive is driven by at least one electric motor;
   an electronic motor speed control system connected with at least one circular knitting machine encoder, wherein a motor speed controller having power electronics and control electronics is structurally incorporated into the electric motor, the motor speed controller being internally directly connected to electric motor windings and being connected externally via a cable strand to an interface unit arranged separately from the electric motor at the circular knitting machines, wherein the circular knitting machine encoder is connected to the interface unit, wherein a motor supplying current and a target value of the target speed of the electric motor are supplied by the cable strand, wherein the target value represents a ratio between the actual speed of the circular knitting machine and the target speed of the electric motor; and
   wherein the target value is generated in the interface unit by processing the signals of the circular knitting machine encoder and functional parameters being input into the speed control system.

2. Circular knitting machine according to claim 1, wherein the interface unit comprises a common interface unit provided for several of the belt drives, each said belt drive having one or more of the electric motors.

3. Circular knitting machine according to claim 1, wherein the interface unit comprises at least one rectifier, and wherein the interface unit is provided with an inlet for receiving mains current and with several cable strand inlets for receiving a first connection cable from the circular knitting machine encoder and for receiving a second connection cable from a setting terminal of the motor speed control system, and wherein the interface unit is provided with a logic circuitry for generating the target value.

4. Circular knitting machine according to claim 1, wherein the cable strand includes a current cable and a separate signal cable.

5. Circular knitting machine according to claim 3, wherein at least the first and second connection cables comprise optical fiber cables.

6. Circular knitting machine according to claim 1, wherein a motor encoder is integrated into the electric motor, and wherein the motor encoder is connected to the motor speed controller for comparison between the target value and the actual value of the electric motor speed being signaled by the motor encoder.

7. Circular knitting machine according to claim 1, wherein the knitting machine is equipped with the at least one belt drive for driving the yarn feeding devices and wherein the at least one electric motor comprises a speed controlled permanent magnet motor.

8. Circular knitting machine comprising:
   a plurality of yarn feeding devices;
   at least one belt drive connected to said yarn feeding devices;
   an electric motor for driving said at least one belt drive;
   an electronic motor speed controller having power electronics and control electronics structurally incorporated into the electric motor and connected to electric motor windings of said electric motor for controlling the speed of said electric motor;
   an interface unit arranged separately from the electric motor;
   a cable strand connecting said interface unit to said electric motor;
   a circular knitting machine encoder for providing machine encoder data to said interface unit; and
   a setting terminal for providing functional parameters to said interface unit, wherein said interface unit has circuitry for receiving the functional parameters and the machine encoder data and for calculating a target value for the target speed of the electric motor, the interface unit providing the target value to said electronic motor speed controller via the cable strand to operate the electric motor.

9. Circular knitting machine according to claim 8, further comprising:
   a motor encoder integrated into the electric motor to obtain an actual value for the speed of the electric motor, the motor encoder being connected to the motor speed controller to provide the actual speed thereto,
   wherein the motor speed controller compares the target value and the actual value of the electric motor speed to adjust the speed of the electric motor.

10. Circular knitting machine of claim 9, wherein said interface unit is free from receiving an actual value for the speed of the electric motor.

11. Circular knitting machine according to claim 8, the cable strand further comprising a signal cable for providing the target value to the motor speed controller and a cable for providing power to the electric motor.

12. Circular knitting machine according to claim 8, wherein the machine encoder determines the actual speed of the circular knitting machine and wherein the target value represents a ratio between the actual speed of the circular knitting machine and the target speed of the electric motor.

13. Circular knitting machine comprising:
a plurality of yarn feeding devices;
at least one belt drive connected to said yarn feeding devices;
a plurality of electric motors having driving rollers for driving said at least one belt drive, at least one said electric motor comprising:
   a housing;
   an electronic motor speed controller including power electronics and control electronics, said motor speed controller structurally incorporated into the housing and connected to electric motor windings of said electric motor for controlling the speed of said electric motor; and
   a motor encoder directly integrated into the housing for determining an actual value of speed for the electric motor,
an interface unit arranged separately from the electric motor;
a cable strand connecting said interface unit to said electric motor;
a circular knitting machine encoder for providing an actual speed of said circular knitting machine to said interface unit; and
a setting terminal for providing functional parameters to said interface unit, said interface unit comprising circuitry for calculating a target value for the target speed of the electric motor, the target value representing a ratio between the actual speed of the knitting machine and a target speed of said electric motor, said electronic motor speed controller receiving from the motor encoder the actual value of speed for the at least one said electric motor and for receiving the target value from said interface unit, said electronic motor speed controller comparing the actual value and the target value to control the speed of the electric motor.

14. Circular knitting machine of claim 13, wherein each of the plurality of said electric motors includes a said motor encoder and a said individual speed controller, each said electric motor being connected to said interface unit for receiving power and for receiving target values for the speed of said electric motor.

15. Circular knitting machine of claim 13, wherein the target values comprise digital messages provided to said at least one electric motor over a field bus system.

16. Circular knitting machine of claim 13, wherein the at least one said electric motor comprises a first said electric motor and said housing comprises a first said housing and the motor encoder comprises a first said motor encoder, wherein at least a second one of said electric motors comprises a second housing structurally incorporating a second motor encoder and a second electronic motor speed controller, said second motor speed controller being connected to electric motor windings of the second electric motor for controlling the speed of the second said electric motor.

17. Circular knitting machine of claim 16, wherein said interface unit provides the target value to the first and second said electric motors.

18. Circular knitting machine of claim 13, wherein said interface unit is free from receiving an actual value for the speed of the electric motor.

* * * * *